United States Patent
Kramer

(10) Patent No.: US 6,213,843 B1
(45) Date of Patent: Apr. 10, 2001

(54) METHOD FOR GRINDING SURFACES OF WORKPIECES

(75) Inventor: Dietmar Kramer, Zürich (CH)

(73) Assignee: Agathon AG Maschinenfabrik, Solothurn (CH)

( * ) Notice: Subject to any disclaimer, the term of this patent is extended or adjusted under 35 U.S.C. 154(b) by 0 days.

(21) Appl. No.: 09/173,098

(22) Filed: Oct. 14, 1998

(30) Foreign Application Priority Data

Oct. 14, 1997 (EP) .................................................. 97810774

(51) Int. Cl.⁷ .............................. B24B 49/00; B24B 51/00
(52) U.S. Cl. ...................................... 451/5; 451/8; 451/21; 451/53; 451/56; 451/72
(58) Field of Search ........................... 451/5, 8, 21, 22, 451/53, 56, 72; 125/11.04, 11.18, 11.19, 11.22, 11.23

(56) References Cited

U.S. PATENT DOCUMENTS

| | | | | |
|---|---|---|---|---|
| 5,547,414 | * | 8/1996 | Ohmori ................................... | 451/21 |
| 5,827,112 | * | 10/1998 | Ball ......................................... | 451/21 |
| 5,833,520 | * | 11/1998 | Kanda et al. ........................... | 451/72 |

FOREIGN PATENT DOCUMENTS

| | | | |
|---|---|---|---|
| 58-113322 | 5/1983 | (JP) ................................ | B24B/53/00 |
| 3-269277 | 10/1991 | (JP) ................................ | B24B/49/18 |
| 4-200438 | 7/1992 | (JP) ................................ | B24B/53/00 |

\* cited by examiner

Primary Examiner—Timothy V. Eley
(74) Attorney, Agent, or Firm—Pearne & Gordon LLP

(57) ABSTRACT

In a method and an apparatus for carrying out said method for grinding surfaces of workpieces with a grinding wheel, an electrode is provided which is disposed spaced apart from the grinding wheel, so that a gap is formed. An electrolytic cooling lubricant is introduced into the gap. By means of a power source, a current is generated which is conducted through the electrode, the electrolytic lubricant and the grinding wheel. An electrochemical conditioning of the grinding wheel thereby takes place, the wheel being thus sharpened. During the grinding operation, the forces exerted by the grinding wheel on the workpiece to be ground are measured, on the basis of which the electrochemical conditioning of the grinding wheel is controlled by changing the intensity of the said current using a computing and control device. The electrochemical conditioning of the grinding wheel can be carried out before, during and/or after the grinding operation, continuously or in intervals. The sharpness of the grinding wheel can thereby be kept constant over a long period of time. The machining time for the workpiece and the quality of the workpiece are optimal.

8 Claims, 7 Drawing Sheets

METHOD FOR GRINDING SURFACES OF WORKPIECES

BACKGROUND OF THE INVENTION

This invention relates to a method for grinding surfaces of workpieces using a metal bonded grinding wheel, which is sharpened through an electrochemical conditioning by means of an electrode, which is disposed spaced apart from the grinding wheel so that a gap is formed between the electrode and the grinding wheel, an electrolytic cooling lubricant, introduced into said gap, and a power source, by means of which a current is conducted through the electrode, through the electrolytic cooling lubricant and through the grinding wheel.

In addition, the invention relates to a grinding apparatus for surfaces of workpieces with a metal bonded grinding wheel, which can be sharpened through an electrochemical conditioning.

Growing demands with respect to economic efficiency, obtainable workpiece surface quality and precision are being put on grinding methods of this kind, in particular for grinding indexable inserts. Since the respective workpieces are made of very hard material, this means that conventional grinding wheels are no longer able to meet these demands sufficiently. Conventional grinding wheels of this kind have a bonding system of artificial resin or ceramic, by means of which the grinding grains are held. Grinding wheels of this kind have to be sharpened again through a dressing operation after being used for only a short time. Owing to the strong abrasion of the grinding wheel and the relatively frequent dressing operation, the aforementioned demands cannot be fulfilled.

Metal bonded grinding wheels are better suited for grinding methods of this kind. Compared with grinding wheels having other types of bonding, these grinding wheels have great advantages, evidenced in particular by the very high grain retention of the bonding, an enlarged grain protruding length of 30 to 50% of the grain diameter, a larger chip space and a more abrasion-resistant bonding system. Moreover the heat elimination is also optimal, owing to the metallic bonding material.

This metal bonding, however, also has a big drawback. Because of the increased abrasion resistance of the bonding system, the self-sharpening effect is disturbed. The metal bonding of the grinding wheel can no longer be restored through abrasion of the worn material particles. The dull grinding particles are no longer released from the grinding wheel bonding, the whole grinding wheel becomes blunt, and the grinding process very soon comes to a standstill. Restoration of the optimal grinding wheel topography has to take place through a sharpening process, which has as a consequence high non-productive times, and which therefore reduces the economic efficiency of the entire grinding process.

Known from the European patent EP-A-0 576 937 is a method and a device for grinding a mirror surface with a grinding wheel, which wheel has a metal bonding. Here the grinding wheel is sharpened during the grinding operation in that a current is conducted between an electrode, disposed adjacent to the grinding surface of the grinding wheel and the grinding wheel, so that the grinding wheel can be sharpened electrolytically with the aid of a conductive solution.

With this device and method the quality of the surface of the grinding wheel is improved during the operation of grinding the mirror surface; however, it cannot be ascertained whether the grinding wheel would be sharpened more than the grinding operation would require. This could lead to excessive wear and tear on the grinding wheel. It is also not discernible whether the grinding wheel is in a state allowing it to perform an optimal grinding operation.

At the same time, achieving mirror surface quality is only possible by depositing solid lubricants in the form of oxides, hydroxides and cooling lubrication materials in the chip space of the grinding wheel. The chip space of the grinding wheel is thereby greatly reduced in size, whereby the transport of cooling lubricant into the grinding contact zone and material particles out of the grinding contact zone is only possible in a more limited way. Cool-lubricating, abrasion-intensive grinding processes, characterized by very low process forces and stable sharpness conditions over a very long time period, cannot be achieved with the device and the method according to EP-A-0 576 937.

SUMMARY OF THE INVENTION

One object of the present invention is thus to create a method with which the sharpening operation, and therefore also the grinding operation, can be optimized, whereby the economic efficiency of the machining process, the surface finish quality, the precision of the machined workpieces and the edge life of the grinding wheels are improved.

This object is attained according to the invention in that during the grinding operation at least one dimension is measured of a force exerted by the grinding wheel on the workpiece to be ground, and, on the basis of this at least one measured value, the intensity of the electrochemical conditioning of the grinding wheel is controlled by changing the intensity of said current using a computing and control device.

By measuring indicative values relating to the state of sharpness of the grinding wheel, the electrochemical conditioning can be adjusted in such a way that the sharpness of the grinding wheel is constant over a long period of time.

A grinding wheel delivered by a supplier is preferably subjected to an electrochemical preconditioning before being used for grinding for the first time. The sharpness of the grinding wheel is thus brought to the desired level.

A further advantage is achieved if, during the grinding operation, the magnitude is measured of the normal force exerted by the grinding wheel on the workpiece to be ground in perpendicular direction and the magnitude is measured of the tangential force exerted in tangential direction. By dividing the thus measured normal force by the corresponding tangential force, a value is obtained which is independent of the size of the contact zone. This value is indicative of the state of sharpness of the grinding wheel so that, based on the course of this value, the electrochemical conditioning of the grinding wheel can be controlled by changing the current intensity.

In a further preferred embodiment of the invention, the residual normal force is measured, after termination of the grinding cycle and expiration of the pregiven spark-out time, which measured value is compared with a pre-given normal force. If the measured residual normal force after expiration of the spark-out time is greater than the pre-given residual normal force, then the value obtained by division of the normal force by the tangential force can be reduced. The result is that the electrochemical conditioning is activated longer, and the grinding wheel is sharpened.

If the measured residual normal force before expiration of the pre-given spark-out time is less than the pre-given residual normal force, the operation can be ended prematurely. These steps result in an optimization of the grinding operation.

A further object of the present invention is to create an apparatus for carrying out the method with which the desired grinding operation and the electrochemical conditioning of the grinding wheel can be executed in an optimal way, which is achieved, according to the invention, through an apparatus comprising a grinding device, in which a metal bonded grinding wheel is disposed, which is rotatingly drivable by means of a driving motor, chucking means for holding a workpiece to be ground, an electrode mounting with inserted electrode, which is held in such a way that a gap is formed between electrode and grinding wheel, feed means for supply of the electrolytic cooling lubricant into the area of the gap, a current generation means for generating a current which is conducted by conductor means through the electrode and the grinding wheel, measuring means to measure during the grinding operation the normal force and tangential force acting between the grinding wheel and the workpiece, and a computing and control device for collecting the measured values and for controlling the process of electrochemical sharpening of the grinding wheel as well as the grinding operation.

The metal bonding of the grinding wheel, in which the grinding grains are bound, is preferably composed of a bronze bonding substance and a carbon-iron filler material. The baser metallic filler material is preferably dissolved during the electrochemical conditioning, whereby achieved with the nobler bonding substance, which is responsible for the solidity of the grinding wheel, is the production of a grinding wheel topography, through electrochemical sharpening, having very high excess projecting lengths of the grains and large amounts of chip space.

In a further preferred embodiment of the invention, the measuring means for measuring the normal force comprises a piezoelectric sensor, which transmits the signal to the computing and control device, whereas the measuring means for measuring the tangential force determines the output of the driving motor of the grinding wheel, and transmits the signal to the computing and control unit, where the tangential force can be calculated. A simple construction of the apparatus is thereby achieved.

To obtain an optimal electrochemical conditioning, the electrolytic cooling lubricant is led through bores, provided in the electrode, into the gap between the grinding wheel and the electrode. At the same time the electrolytic cooling lubricant is sprayed, using a free jet nozzle into the grinding contact zone between the workpiece and the grinding wheel, an optimal cooling being achieved.

The bores in the electrode are preferably disposed on adjacent, arc-shaped lines and are offset with respect to one another, whereby it is ensured that the entire gap region is practically filled up with the electrolytic cooling lubricant in an optimal way.

In addition, a high pressure cleaning jet can also be provided which is integrated into the electrode mounting, and through which the electrolytic cooling lubricant is sprayed under high pressure directly on the grinding wheel. A cleaning of the grinding wheel is thus achieved.

The method according to the invention and an apparatus for carrying out this method will be explained more closely in the following, by way of example, with reference to the attached drawing.

DETAILED DESCRIPTION OF THE INVENTION

Figure 1:
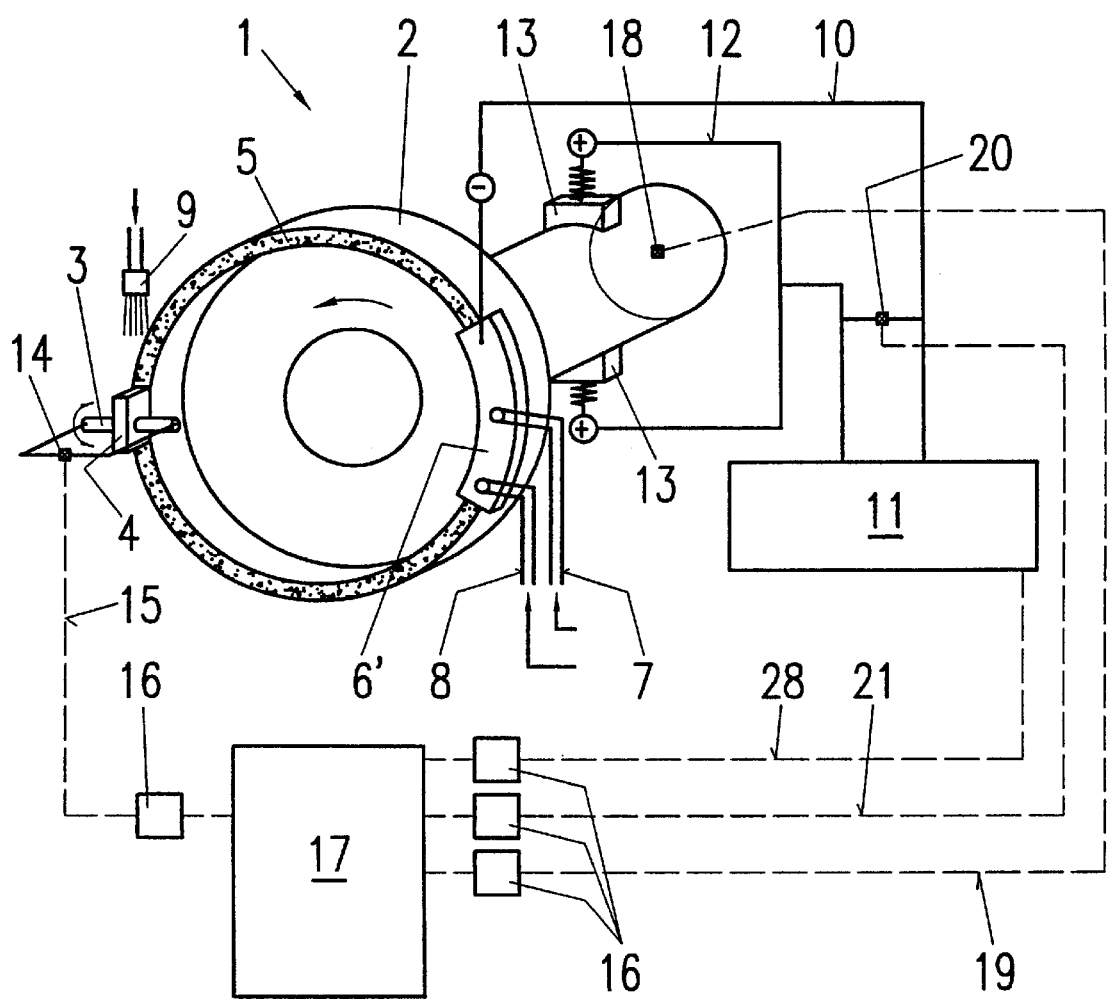
FIG. 1 is a diagrammatic representation of the apparatus for grinding workpieces with measuring elements of the computing and control device and with current generation means.

As can be seen in FIG. 1, the grinding device 1 comprises a grinding wheel 2, mounted in a machine frame (not shown), and which can be driven in rotation by means of a driving motor (also not shown) in a conventional way. The workpiece 4 can be held in the chucking means 3. In the embodiment shown, the workpiece 4 is an indexable insert, which is to be machined peripherally. For this purpose, the grinding wheel 2 is designed as a cup wheel. The chucking means are designed conventionally in such a way that the grinding surface 5 of the grinding wheel 2 can carry out all the grinding operations necessary for the indexable insert.

Provided on the opposite side of the chucking means 3 in the region of the grinding wheel is an electrode mounting 6' with an electrode 6, which is made of copper or graphite and which is embedded in the plastic housing of the electrode mounting 6'. This plastic housing serves as insulation with respect to the grinding device 1. This plastic housing is fastened in a known way to a linear shaft (not shown), with the aid of which the spacing of the electrode 6 to the surface 5 of the grinding wheel 2 can be set precisely.

Supply lines 7 and 8 open out into the plastic housing of the electrode 6, through which lines the electrolytic cooling lubricant can be conducted into the electrode gap from a supply tank (not shown) in a known way.

Supplied with electrolytic cooling lubricant from the same supply tank is an open jet nozzle 9 by means of which the electrolytic cooling lubricant can be sprayed into the grinding contact zone between the workpiece 4 and the grinding wheel 2.

The electrode 6 is connected via connection lines 10 to a current source 11 by the negative pole. The positive pole of the current source 11 is connected via further connection lines 12 to brushes 13, which are in contact in a known way with the shaft of the grinding wheel 2. The flow of current thus takes place from the current source via the further connection lines 12 to the brushes 13, the shaft of the grinding wheel to the grinding wheel itself 2, and reaches the electrode gap via the grinding wheel surface 5.

The current source 11 supplies the electrode 6, which works as a cathode, with a preferably continuous, non-pulsed direct current. It would also be possible, however, to work with a pulsed direct current or with an alternating current.

Mounted in a known way in the region of the workpiece feed with the chucking means 3 is a first measuring means 14, designed as piezoelectric sensor, which can measure the normal force N with which the workpiece 4 is pressed against the grinding surface 5 of the grinding wheel 2. The corresponding signal is transmitted through the line 15 to a computing and control device 17, after amplification, filtering and transformation has taken place in a known way in the component 16.

With a second measuring means 18, with which the output of the driving motor is ascertained, the tangential force T, exerted by the grinding wheel 2 on the workpiece 4, is calculated in the computing and control unit 17, to which this second measuring means 18 is connected via the line 19.

The current intensity I is picked up directly at the output of the current source 11, and the voltage U is measured through a probe 20, this value being likewise supplied to the computing and control device 17 via lines 21 or respectively 28.

These signals are also adapted in a known way in the respective electronic components 16 for further processing in the computing and control device 17.

Figure 2:
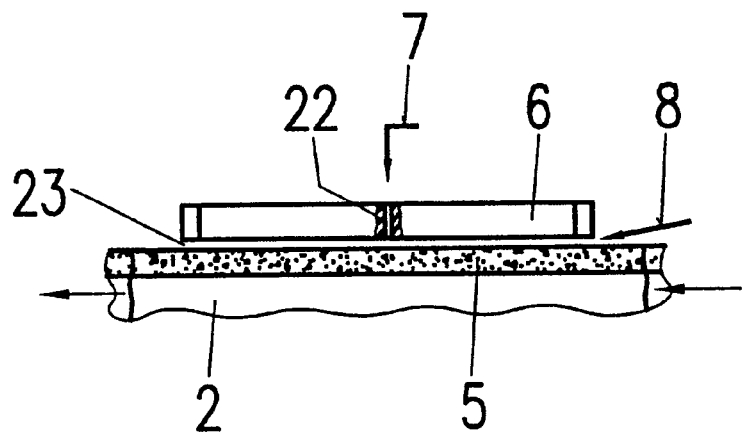
FIG. 2 shows diagrammatically a view of the electrode, partially in section, and the grinding wheel.
Figure 3:
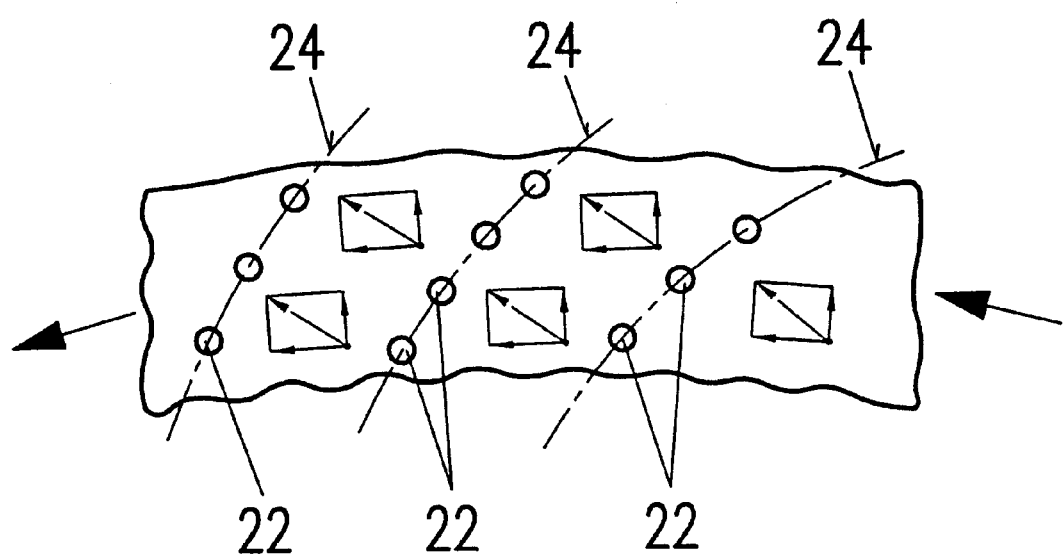
FIG. 3 is a partial view of the surface of the electrode, which is turned toward the grinding wheel.

As can be seen from FIGS. 2 and 3, the electrolytic cooling lubricant is conducted through the supply line 7 through bores 22 disposed in the electrode 6 directly into the electrode gap 23, which has a width of about 0.2 to 0.3 mm. The bores 22 are disposed on arc-shaped lines 24 and are offset with respect to one another. The pressure, under which the electrolytic cooling lubricant is supplied to these bores amounts to about 5 to 10 bar. This configuration as well as the housing of the electrode 6 overlapping the grinding wheel 2 should greatly reduce the leakage losses in the electrode gap 23, which could arise owing to the centrifugal force acting upon the liquid particles.

A high pressure cleaning jet can also be integrated into the plastic mounting 6 for the electrode 6. The cleaning jet can be supplied via the supply line 8. This jet has a rectangular shape through which the high pressure cleaning stream can reach the entire width of the grinding wheel. With a feed pressure of 40 to 80 bar and a placement of the jet turned 10° toward the grinding wheel assembly, it is possible to clean the grinding wheel of stripped-off particles and electrochemical conversion products. This not only improves the abrasive capacity of the grinding process and the efficiency of the electrochemical process, but by cleaning the interim spaces between the chips of the grinding wheel 2, the grinding forces decrease and the grinding contact zone can be supplied optimally with the electrolytic cooling lubricant. The cleaning of the grinding wheel can take place in intervals or continuously, before, during or after the grinding operation.

The electrode width encircles exactly the grinding wheel width, and extends over 15 to 20% of the grinding area of the grinding wheel.

The grinding wheel 2 has a metal bonding 25, as can be seen in FIGS. 4 to 7, in which the grinding grains 26 are bound. The grinding grains can be diamond grains, for example, or cubical boron nitride (CBN) grains. The metal bonding 25 is composed of a bronze bonding material and a filler material of carbon-iron. The bonding material hereby surrounds the grinding grains and the metallic filler material like a solder network, and thus gives the grinding wheel coating its necessary solidity.

Figure 4:
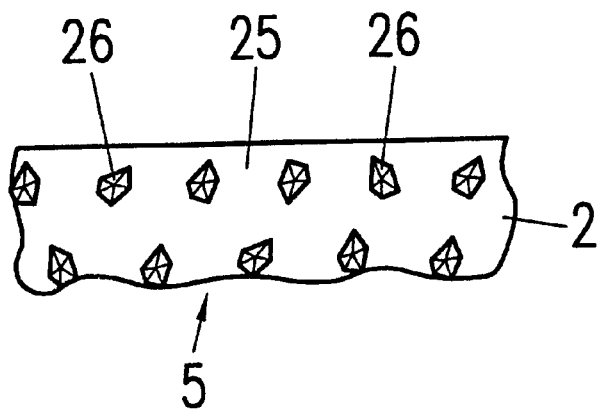
FIG. 4 is a section (enlarged) through the abrasive part of a grinding wheel supplied by the manufacturer.
Figure 5:
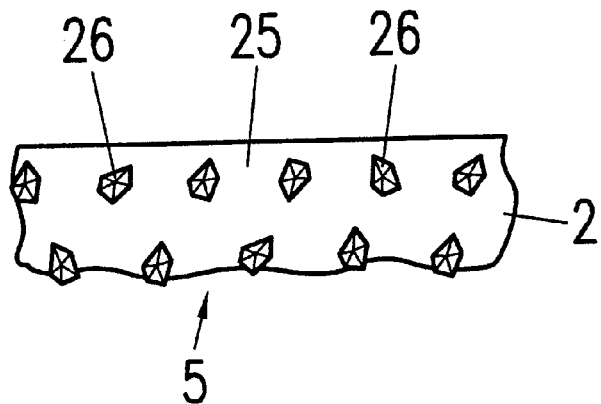
FIG. 5 is a section (enlarged) through the grinding coating of the grinding wheel, which has been dressed conventionally.

The grinding wheel 2 is delivered in the state as shown in FIG. 4, i.e., the grinding grains 26 show practically no excess projecting lengths. Therefore the grinding wheel 2 is first brought into its desired form, corresponding to that shown in FIG. 5, by means of a silicon carbide trimming wheel with the aid of a conventionally driven trimming device. After this conventional trimming step, the electrochemical pre-sharpening of the grinding wheel 2 is carried out. This means that a current I flows in the circuit shown in FIG. 1.

Figure 6:
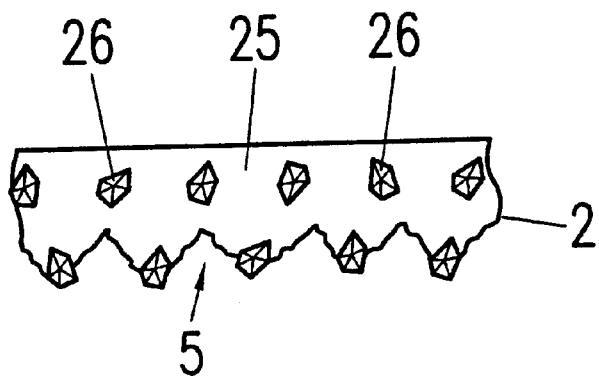
FIG. 6 is a section (enlarged) through the grinding coating of an electrochemically preconditioned grinding wheel.
Figure 7:
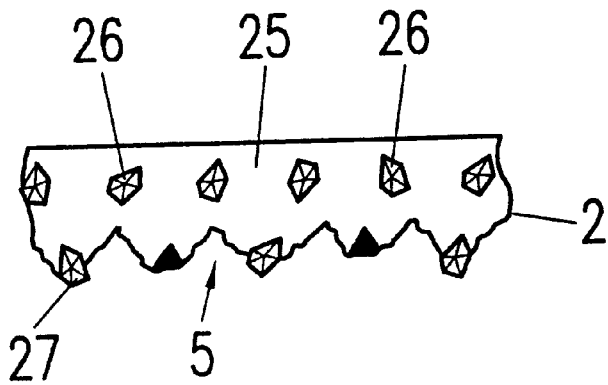
FIG. 7 is a section (enlarged) through the grinding coating of an electrochemically conditioned grinding wheel in operation.

By means of the applied current, a dissolution of the metal bonding 25 into ions or respectively a conversion of the metal bonding into hydroxide and oxide takes place. The metal bonding 25 is set back, so that after the pre-sharpening process, which takes about 5 to 10 minutes and during which the applied current is between 1 and 3 $A/cm^2$, the optimal starting state for the grinding wheel surface is achieved with an average excess length of the grains 26 of 100 to 120% of the average grain diameter, as is shown in FIG. 6.

Following this pre-sharpening step is the grinding operation with the electrochemical sharpening of the metal bonded grinding wheel 2. During this grinding operation, a further dissolution of the metal bonding 25 into ions or respectively a conversion of the metal bonding into hydroxide and oxide takes place through the applied current. By means of these electrochemical reactions and the attrition of the oxide and hydroxide by the abraded material, the metal bonding 25 is set back further. Dull grinding grains 27 are released from the bonding, and new sharp grinding grains appear on the grinding surface 5. For the electrochemical conditioning of the grinding wheel 2 during the grinding operation, the current density is between 0.1 and 2 $A/cm^2$, depending upon the machining task.

According to Faraday's Law, the removed mass is proportional to the current intensity and the time, and thus the speed of dissolution of the metal bonding can be controlled and furthermore adjusted, and adapted to the respective state of sharpness of the grinding wheel, as will still be described later on. To achieve the highest possible electrochemical efficiency and thus also the highest possible speed of dissolution during the electrochemical process, the flow of current should be designed in such a way that the overall ohmic resistance is as low as possible. The possible electrochemical reactions depend very much upon the fed potential, the pH value and the chemical composition of the electrolytic cooling lubricant, and thus can also be influenced.

As an electrolytic cooling lubricant which can be used in cooling lubricant circuits or respectively in electrolyte circuits which are not separated, the developed fluid must have the features of a cooling lubricant as well as those of an electrolyte. The electrolytic cooling lubricant thus serves not only to cool and lubricate the grinding contact zone, the workpiece or respectively the grinding wheel, but should also facilitate the dissolution of the metal matrix and the supply of current without formation of large oxide and hydroxide deposits, should protect the copper electrode from metal separation, not have too high a pH value (skin tolerance) and prevent polymerization on the electrodes. The electrolytic cooling lubricant used in the embodiment example described is a synthetic, water-soluble concentrate which is used with deionized water in a 5% solution. The electrolytic cooling lubricant has a pH of 9.6 and an electrical conductivity of 3.9 mS/cm.

As already described, with the configuration shown in FIG. 1 the normal force N and the tangential force T can be measured during the grinding operation. On the basis of these measured values, a statement can be made about the state of sharpness of the grinding wheel. As will be described later on, through control of the electrochemical conditioning of the grinding wheel, the wheel can be kept in an optimal state of sharpness over a very long period of time, i.e. for a large number of workpieces to be machined.

Figure 8:
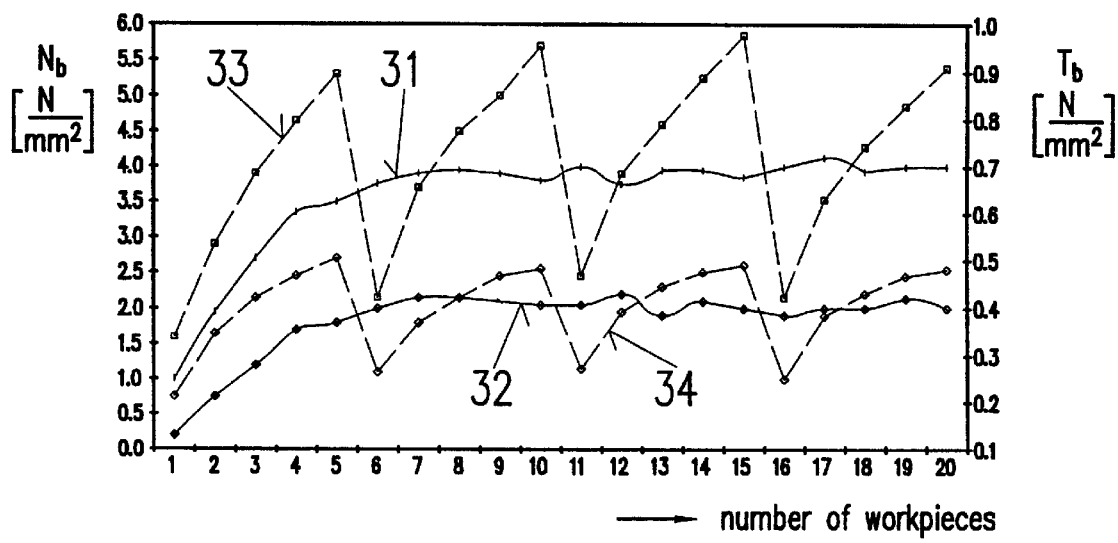
FIG. 8 is a graph of the course taken by the forces in conventional grinding processes and in the grinding method according to the invention with electrochemical conditioning.

The difference between the method according to the invention and a conventional grinding method (artificial resin bonded grinding wheel) is best made clear through a comparison of the courses of forces in both types of grinding operation. Shown in the diagram in FIG. 8 are the obtained normal forces $N_b$ and the obtained tangential forces $T_b$, which are calculated in each case from the measured force, divided by the respective size of the grinding contact zone. Involved therefore are, in principle, grinding pressures.

The courses of the forces in the method according to the invention are indicated by the curves 31 and 32 shown in FIG. 8. Curve 31 shows the course of the obtained normal force $N_b$, whereas curve 32 shows the course of the obtained tangential force $T_b$. Curves 33 and 34 relate to the conventional grinding method. Curve 33 shows the course of the obtained normal force $N_b$, and curve 34 shows the course of the obtained tangential force $T_b$. It can be seen from the figure that the method according to the invention is distinguished by a stable course of the process forces compared to the conventional grinding method. After an initial grinding operation of about four workpieces, during which the grinding wheel topography adapts itself to the current machining task, after the profiling and presharpening operation, the process forces obtained remain constant with the method according to the invention. With the conventional grinding method, the forces obtained are significantly higher than with the method according to the invention, and reach the criterion for trimming already after five workpieces. This means that the grinding wheel is blunt, the grinding forces are too high for the grinding machine—grinding wheel—workpiece system, and a conventional trimming operation must be started. After this trimming operation, the conventional grinding method continues with very low process forces. This saw-tooth-shaped course of forces, shown in curves 33 and 34, is typical for the conventional grinding method.

Decisive for the quality of the ground workpiece with respect to exact shape and size is in particular the arising residual normal force $N_r$. The residual normal force $N_r$ is that force which still remains at the end of the spark-out cycle, i.e. after the decline of the grinding pressure through the grinding-over of the workpiece without advance of the workpiece to the tool during the pre-given spark-out time $t_2$. This force can be very great, above all with the hard, modern cutting materials. Owing to elastic deformations and flexibility of the grinding machine-workpiece-grinding wheel system, this residual force leads to considerable impression with respect to size and shape of a workpiece, in particular in the case of indexable inserts. Moreover with the conventional grinding methods, there are, in addition, the fluctuations in precision with respect to shape and size, which arise over time because of the periodically changing state of sharpness of the grinding wheel. As will be explained later on, the residual normal force $N_r$ is therefore monitored, and is used, along with other things, to control the electrochemical conditioning of the grinding wheel. It has been discovered that in practice a setting of the residual normal force $N_r$ at 70 to 80 N is expedient.

Figure 9:
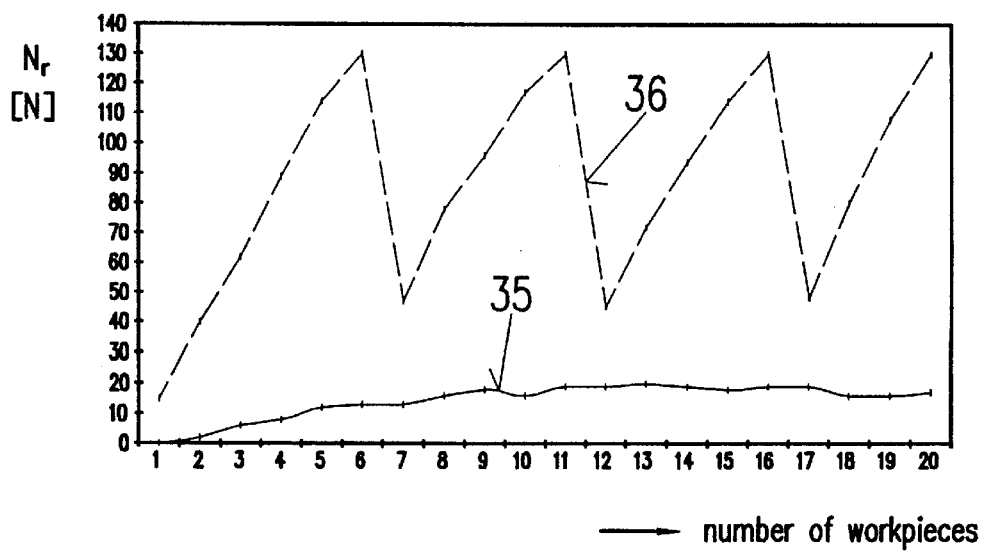
FIG. 9 is a graph of the course of the residual normal force in the method according to the invention and of the residual normal force in the conventional method.

The course of the residual normal force is shown in the diagram in FIG. 9. Curve 35 shows the course of the residual normal force of the method according to the invention, whereas curve 36 shows the course of force in a conventional grinding operation, whereby again the saw-tooth-shaped course of forces arises, which is typical for the conventional grinding method.

Grinding processes are characterized by the ratio of abraded workpiece volume to the used grinding wheel volume. This ratio is called the G-value. In conventional grinding methods, the G-value is supposed to be as high as possible, but the grinding wheel is supposed to nevertheless work in the self-sharpening sphere. In the method according to the invention the G-value is pre-given through the electrochemical sharpening process, and can also be changed during the process. Whereas the G-value in conventional methods is adapted to the current machining task by changing the hardness of the grinding wheel, i.e. using a new grinding wheel, the hardness of the grinding wheel in the method according to the invention is achieved by changing the speed of dissolution. In principle, the metal bonded grinding wheel has an extremely hard bonding system, i.e. no abrasive wear and tear arises on the grinding wheel bonding from the grinding process itself; the wheel displays absolutely no self-sharpening action. The hardness of the metal bonding is thus predetermined by the speed of its electrochemical dissolution, and is adapted to the respective machining task.

The setting of the speed of dissolution takes place according to experimental values. The adaptation of the dissolution speed to the current state of sharpness of the grinding wheel, depending upon the machining task, takes place in the method according to the invention through control of the electrochemical conditioning.

Needed for this control is a value which is measurable during the grinding operation and which indicates the state of sharpness of the grinding wheel, and which furthermore is independent, to a far-reaching extent, from the geometry of the workpiece or respectively the size of the grinding contact surface of the current machining task. This parameter is the value k, which is constituted by the ratio of the normal force N to the tangential force T.

The normal force N and the tangential force T are measured, as already mentioned.

Figure 10:
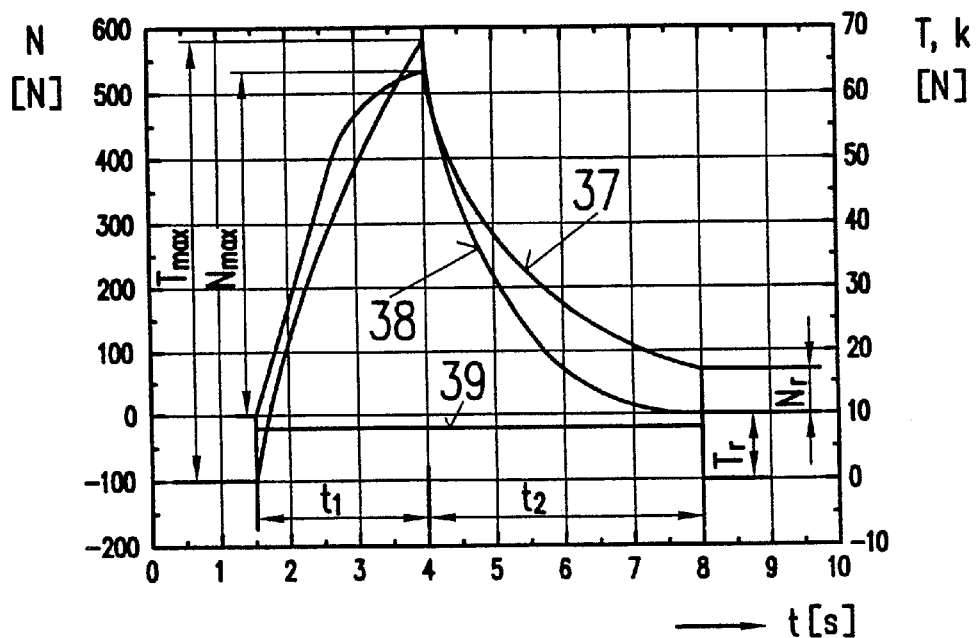
FIG. 10 is a graph of the course of the normal force and of the tangential force and of the value k determined therefrom.

In the diagram in FIG. 10, the course of the normal force N (curve 37), the course of the tangential force T (curve 38) and the value k (curve 39) are shown in dependence upon the grinding cycle time. The time domain $t_1$ represents the cutting time, while the time domain $t_2$ represents the spark-out time.

Figure 11:
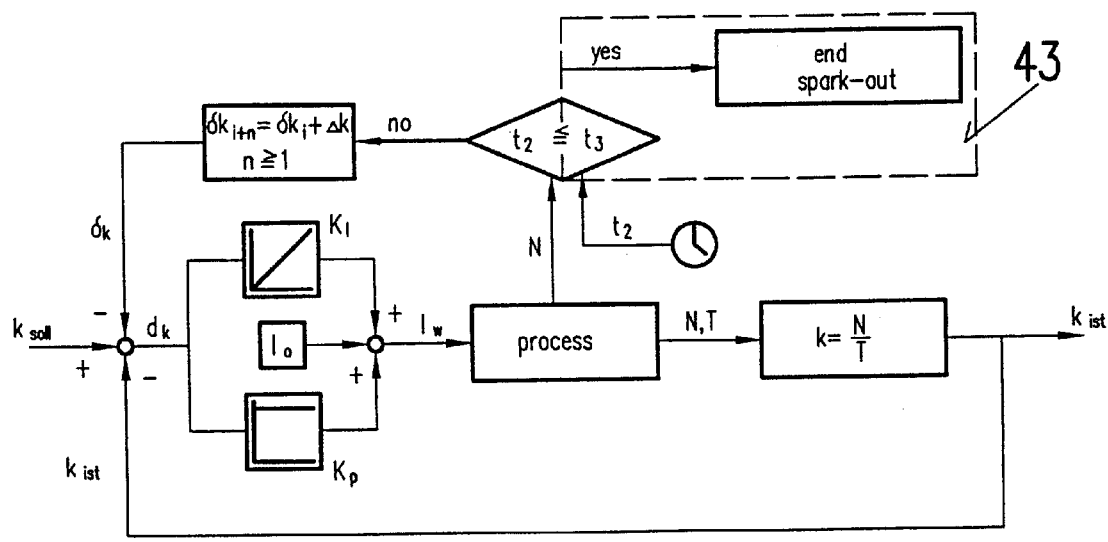
FIG. 11 is a block diagram of the control of the method with spark-out time minimization module.

For control, as shown in FIG. 11, the two parameters normal force N and tangential force T are measured in an integrating way in the domain of the cutting time $t_1$, visible in FIG. 10, within a very short time window. The value k results from these two measured values. The maximal normal and tangential forces, as marked in FIG. 10, are not decisive for control of the method according to the invention.

The value $k_{soil}$ thus represents the starting value for the process control. As a control device, a PI controller is used, which regulates the manipulated variable $I_w$, which is the working current intensity of the electrochemical conditioning of the grinding wheel. Besides adjustment of the value $k_{soil}$ or respectively correction thereof, this control loop is also used to minimize the spark-out time $t_2$. This spark-out time minimization works in principle on the basis of monitoring of the normal force N during the spark-out. By means of this spark-out time minimization, the machining times for grinding a workpiece can be considerably reduced. At the same time the reliability of the method and the quality of the workpiece can be significantly improved by means of constant residual normal forces. This control also brings clear advantages with respect to the edge life of the individual abrasive grain. The individual abrasive grain can be kept sharp much longer since it no longer slides at high speed over the workpiece surface and produces heat when it is not taking part in the cutting process or has not penetrated into the workpiece surface during removal of workpiece material.

Figure 12:
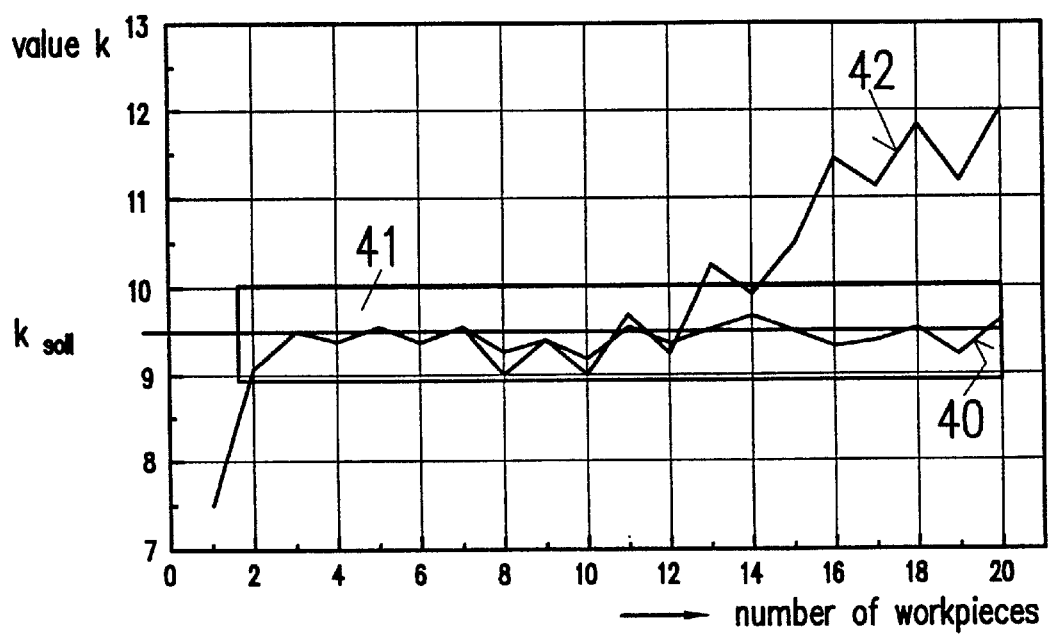
FIG. 12 is a graph of the value k in the controlled and the uncontrolled grinding method.

By means of this control of the method, the state of sharpness of the grinding wheel can always be kept within a constant range after the initial grinding operation. This is shown in FIG. 12. The value k, indicated by the curve 40, should not deviate very much from the value $k_{soil}$, but should vary within a target window 41. When the process runs uncontrolled, the value k increases after the initial grinding operation and after a short phase of constant grinding conditions, as shown by curve 42.

The control, as illustrated in FIG. 11, comprises a spark-out time minimization module 43. The yes branch of the decision box of the control diagram $t_2 \leq t_3$ leads to termination of the spark-out step. The no branch of this box serves to correct the value $k_{soil}$ if the remaining control loop can keep the value k within the pre-given target window 41 (FIG. 12); the residual normal forces, however, grow bigger and bigger. This means that the ground surfaces can no longer be ground further, owing to a dulled grinding wheel. With this in mind, there is no absolute indication of the spark-out time $t_2$, but instead a spark-out time limit $t_3$ is set, within which the spark-out of the surfaces, below the set limit for the residual normal force $N_r$, must be carried out. The limit for the residual normal force $N_r$ for the grinding machine—grinding wheel—workpiece system with its workpiece chucking device of the embodiment example shown here is at about 60 to 80 Newton.

Economical spark-out times should in any event be less than 5 seconds.

Figure 13:
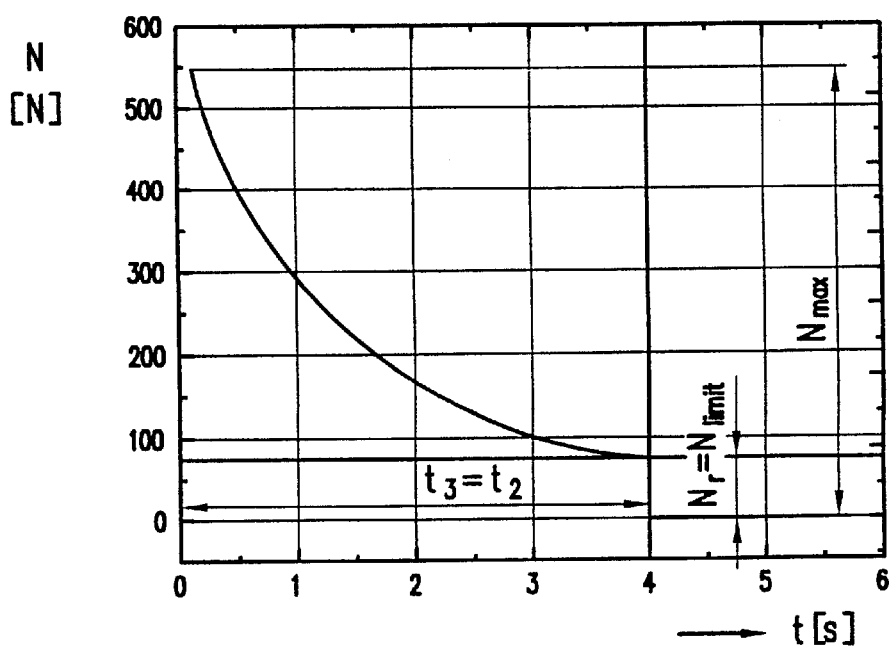
FIG. 13 is a graph of the course of the normal force during the spark-out time.

In the embodiment according to FIG. 13 the limit for the residual normal force $N_r$ was set at 80 Newton and the limit for the spark-out time $t_3$ at 4 seconds. The spark-out cycle shown here goes right through the point of intersection of the two limits. This is a special case. As a rule, it is possible to distinguish between the following two cases, which are shown in FIGS. 14 and 15.

Figure 14:
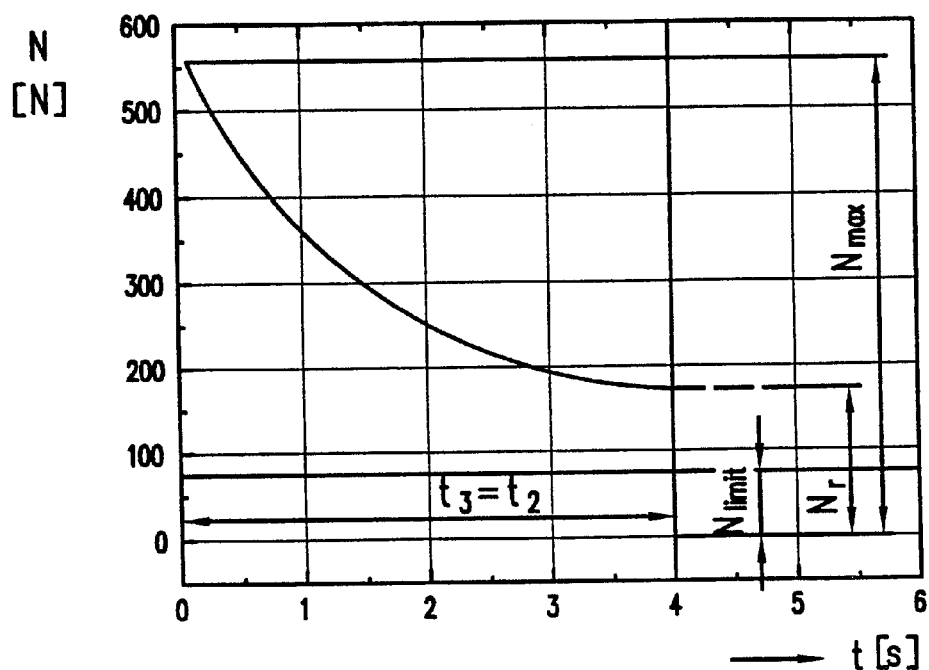
FIG. 14 is a graph of the course of the normal force during the spark-out time, in which the value k is to be reduced.

According to FIG. 14, after expiration of the limit set for the spark-out time $t_3$, the residual normal force $N_r$ clearly exceeds the desired residual normal force limit. A prolongation of the spark-out time by one second would not cause any further reduction of the residual normal force $N_r$, and would have a negative influence upon the economic efficiency of the grinding process. At the same time a prolongation of the spark-out time $t_3$ would also be very disadvantageous for the current state of sharpness of the grinding wheel since the grinding grains would be led at very high speed over the workpiece surface without any further removal of material or respectively reduction of the grinding pressure taking place. Instead, the grinding grains would generate a lot of friction and thus frictional heat, whereby thermal damage to the grinding grains could result. Not attaining the residual normal force limit within the spark-out time limit $t_3$ means that the set value $k_{soil}$ of the method applied is too high and must be corrected downward.

This is achieved through the no-branch of the box $t_2 \leq t_3$ of the control diagram according to FIG. 11.

Figure 15:
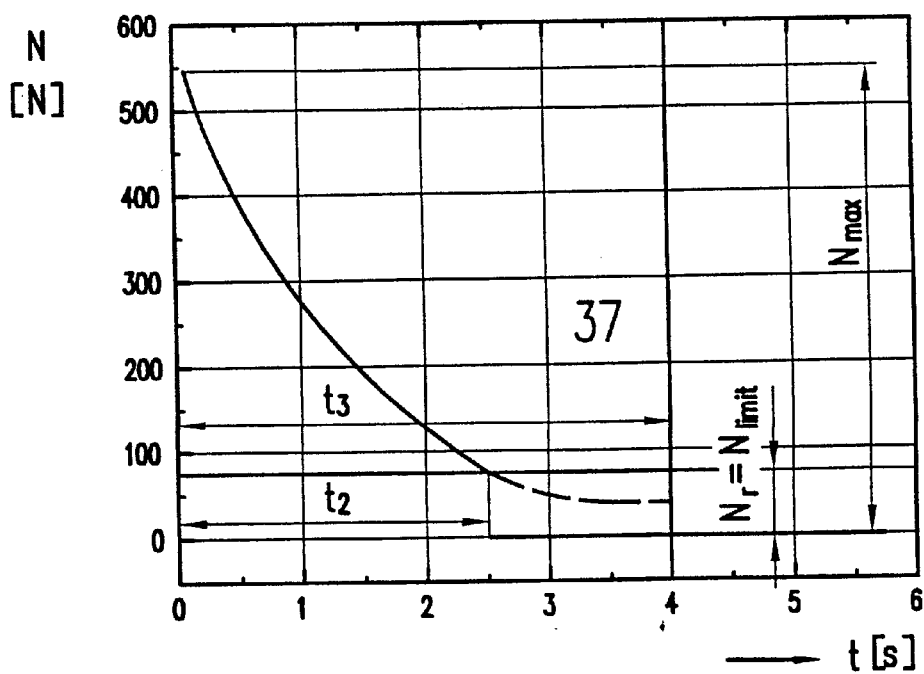
FIG. 15 is a graph of the course of the normal force during the spark-out time in which the spark-out cycle is to be stopped prematurely.

The second case is shown in FIG. 15. It can be seen there that the normal force N lies below the limit set for the residual normal force already before expiration of the limit set for the spark-out time $t_3$. In accordance with the spark-out time minimization, the spark-out cycle is terminated upon reaching the residual normal force limit, as has already been mentioned. Although a further spark-out of the surfaces up to the set spark-out time limit $t_3$ would mean a very tiny reduction of the residual normal force $N_r$, at the same time the machining time would increase, and thus lower the economic efficiency of the machining process.

Besides the purely temporal or economic points of view, there is another technological advantage, however, of this spark-out time minimization module. Independently of the state of sharpness of the grinding wheel and the size of the contact surface of the workpiece surface to the machined, the spark-out of the surfaces always takes place up to the set limit of the residual normal force $N_r$. This means that the sum of all the flexibility or respectively the elastic deformations in the grinding machine—grinding wheel—workpiece system, remains equally great, whereby the reliability of the method with respect to dimensional precision of the machined workpiece increases significantly.

The electrochemical conditioning of the grinding wheel during the grinding operation can take place continuously or in intervals. The electrochemical conditioning of the grinding wheel can be achieved before and/or during and/or after the grinding operation.

Of course it would also be conceivable, for control of the electrochemical conditioning process of the grinding wheel, to use the tangential forces each time, the measuring of which is simpler than measuring the normal forces. It has been shown, however, that the quality of the measurement signal and the related precision and reliability of the decisions of the control loop are considerably higher with the measured normal forces.

As has been already mentioned, this method according to the invention and the apparatus for carrying out the method are not limited to the grinding of indexable inserts, but rather any type of workpiece can be machined, in particular one made of a hard material. These workpieces can also have a minimal thermal conductivity since the elimination of generated heat is optimally ensured, as already mentioned.

What is claimed is:

1. A method for grinding surfaces of workpieces using a metal bonded grinding wheel and for sharpening the wheel by electrochemical conditioning comprising the steps of;
   a) providing an electrode;
   b) spacing the electrode from a grinding wheel so that a gap is formed between the electrode and the grinding wheel;
   c) introducing an electrolytic cooling lubricant into said gap;
   d) passing electrical current through said electrode, through said electrolytic cooling lubricant, and through said grinding wheel;

e) pressing a workpiece to be ground against a surface of said grinding wheel and measuring the magnitude of at least one value of a force exerted by the grinding wheel on the workpiece; and f) as a function of a measured value of said force, controlling electrochemical conditioning of the grinding wheel by changing the intensity of the current with a computing and control device.

2. The method according to clam 1, wherein the grinding wheel is subjected to an electrochemical pre-conditioning before being used for grinding for the first time.

3. The method according to claim 1, wherein at least one value of a force is the magnitude of a normal force exerted by the grinding wheel on the workpiece to be ground, with respect to the grinding wheel surface.

4. The method according to claim 1 wherein at least one value of a force is the magnitude of a tangential force exerted by the grinding wheel on the surface to be ground, with respect to the grinding wheel surface.

5. The method according to claim 4, wherein, in the computing and control device a measured normal force is divided by a measured tangential force, and an actual value is obtained, which is compared with a set value, and is used for control of the current intensity.

6. The method according to claim 5, wherein a grinding operation for machining a workpiece is subdivided into grinding cycles, during each of which at least one part of a surface of a workpiece is ground, and wherein a grinding cycle comprises a cutting period carried out during a cutting time and a spark-out period carried out during a spark-out time, and wherein a residual normal force during the spark-out time is measured and is compared with a pre-given residual normal force.

7. The method according to claim 6, wherein a maximal spark-out time is pre-given, wherein a set value is lowered when the measured residual normal force after expiration of the maximal spark-out time is higher than the pre-given residual normal force.

8. The method according to claim 6, wherein a spark-out cycle is interrupted when, during the maximol spark-out time, the measured residual normal force is smaller than the pre-given residual normal force.

* * * * *

UNITED STATES PATENT AND TRADEMARK OFFICE
CERTIFICATE OF CORRECTION

PATENT NO. : 6,213,843 B1  
DATED : April 10, 2001  
INVENTOR(S) : Dietmar Kramer Page 1 of 1

It is certified that error appears in the above-identified patent and that said Letters Patent is hereby corrected as shown below:

Column 9,
Lines 1, 6, 26 and 35, delete "$k_{soil}$" and insert -- $k_{soll}$ --.

Column 10,
Line 7, delete "$k_{soil}$" and insert -- $k_{soll}$ --.

Column 12,
Line 18, delete "maximol" and insert -- maximal --.

Signed and Sealed this

Seventh Day of May, 2002

Attest:

Attesting Officer

JAMES E. ROGAN
*Director of the United States Patent and Trademark Office*